United States Patent [19]

Caspar et al.

[11] 4,140,540
[45] Feb. 20, 1979

[54] PROCESS FOR THE PREPARATION OF ETTRINGITE FIBERS

[75] Inventors: Jean-Pierre Caspar, le Teil; Jacques Gaillard, Saint Andeol de berg, both of France

[73] Assignee: Societe Anonyme dite: Lafarge, Paris, France

[21] Appl. No.: 846,564

[22] Filed: Oct. 28, 1977

[30] Foreign Application Priority Data

Nov. 8, 1976 [FR] France .................................. 76 33655

[51] Int. Cl.² .............................................. C09C 1/02
[52] U.S. Cl. ................................... 106/306; 106/102; 106/97
[58] Field of Search .................. 106/306, 102, 97; 423/518, 555

[56] References Cited

U.S. PATENT DOCUMENTS

| 3,992,217 | 11/1976 | Baudouin et al. | 106/306 |
| 4,002,484 | 1/1977 | Baudouin | 106/306 |

OTHER PUBLICATIONS

Journal of the American Ceramic Society, 1973, vol. 56, No. 6, p. 318.

*Primary Examiner*—Winston A. Douglas
*Assistant Examiner*—J. V. Howard
*Attorney, Agent, or Firm*—Berman, Aisenberg & Platt

[57] ABSTRACT

The present invention relates to an improvement in the process of U.S. Pat. No. 4,002,484, making it possible to obtain ettringite in fiber form.

According to the invention, the process is carried out in the same way as in U.S. Pat. No. 4,002,484 but with enough water to assure having a suspension containing a maximum of 25% dry matter at the end of the reaction, and in subjecting said suspension to moderate stirring of 1 to 5 times the force necessary to maintain a homogeneous suspension.

Application to the replacement of asbestos fibers, notably as a fire-proof product.

18 Claims, No Drawings

PROCESS FOR THE PREPARATION OF ETTRINGITE FIBERS

The present invention relates to an improvement to the process for the preparation of ettringite, or calcium trisulfoaluminate described in the process of U.S. Pat. No. 4,002,484, which comprises adding water to, and thereby hydrating, a substantially stoichiometric mixture of at least one calcium aluminate and at least one calcium sulphate at a temperature of from 20° C to 100° C to yield ettringite, the amount of water which is added comprising the stoichiometric amount for one of the reactions:

(1) $CaO \cdot Al_2O_3 + 2(CaO \cdot H_2O) + 3(CaSO_4 \cdot 2H_2O) + 24 H_2O \rightarrow (CaO)_3Al_2O_3 \cdot 3CaSO_4 \cdot 32H_2O$ (ettringite), (2) $(CaO)_3Al_2O_3 + 3(CaSO_4 \cdot 2H_2O) + 26 H_2O \rightarrow$ 1 ettringite (3) $CaO(Al_2O_3)_2 + 5(CaO \cdot H_2O) + 6(CaSO_4 \cdot 2H_2O) + 47 H_2O \rightarrow$ 2 ettringite (4) $12CaO \cdot 7Al_2O_3 + 9(CaO \cdot H_2O) + 21(CaSO_4 \cdot 2H_2O) + 173 H_2O \rightarrow$ 7 ettringite (5) $CaO \cdot 6Al_2O_3 + 17(CaO \cdot H_2O) + 18(CaSO_4 \cdot 2H_2O) + 139H_2O \rightarrow$ 6 ettringite and at most an amount such as to obtain (after the reaction) a product containing 5% (dry) ettringite and 95% (by weight) water.

It is specified in the U.S. Pat. No. 4,002,484 that the process permits the production of the mineral filler formed essentially of ettringite and known under the name of "satin white" in all forms thereof (dry powder, solutions or suspensions of concentrations or variable amounts to all intents and purposes at will) and for various industrial compounds, such as aluminous cements, calcium sulphates and hydraulic binders which do not exactly possess the properties of the cements they are normally intended to form.

In Example 7 of the same U.S. Pat. No. 4,002,484 it is stated that sub-micron particles have been obtained by using a jar mill rotating at 70 rotations per minute.

The present invention, on the contrary, solves the problem of obtaining (in a controlled and industrial manner) ettringite in the form of fibers which may, for example, have a length of from 1 or 2 to 350 microns, thus widening the field of applications of the process of the U.S. Pat. No. 4,002,404.

Such fibers have already been observed by research workers in the paste of special cements known as expansive cements (Journal of the American Ceramic Society, 1973, Vol. 56, No. 6, p. 318 or again in supersulphated cements in which 120μ rods have been observed (Cement and Concrete Research, Vol. 1, p. 101, 1971.

But those fibers were dispersed in the cement and it was impossible to separate them from it. Therefore, no industrial process for obtaining such fibers was suggested by those scientific observations.

The process of the invention is an improvement to that of U.S. Pat. No. 4,002,484, said improvement consisting essentially of adding water in at least a sufficient proportion so that the reaction yields a product containing at most 25% solid matter, and effecting the reaction with continuous stirring at a force of from one to five times that necessary to maintain the solid matter existing during the reaction in homogeneous suspension in water.

Therefore, the invention provides a process for the preparation of ettringite which comprises adding water to, and thereby hydrating, a substantially-stoichiometric mixture of at least one calcium aluminate and at least one calcium sulphate at a temperature of from 20° C to 100° C to produce ettringite, the amount of water which is added comprising the stoichiometric amount for one of the reactions:

(1) $CaO \cdot Al_2O_3 + 2(CaO \cdot H_2O) + 3(CaSO_4 \cdot 2H_2O) + 24 H_2O \rightarrow (CaO)_3Al_2O_3 \cdot 3CaSO_4 \cdot 32H_2O$ (ettringite)

(2) $(CaO)_3Al_2O_3 + 3(CaSO_4 \cdot 2H_2O) + 26 H_2O \rightarrow$ 1 ettringite (3) $CaO(Al_2O_3)_2 + 5(CaO \cdot H_2O) + 6(CaSO_4 \cdot 2H_2O) + 47 H_2O \rightarrow$ 2 ettringite (4) $12CaO \cdot 7Al_2O_3 + 9(CaO \cdot H_2O) + 21(CaSO_4 \cdot 2H_2O) + 173 H_2O \rightarrow$ 7 ettringite (5) $CaO \cdot 6Al_2O_3 + 17(CaO \cdot H_2O) + 18(CaSO_4 \cdot 2H_2O) + 139 H_2O \rightarrow$ 6 ettringite and a supplementary amount of water to obtain (after the reaction) a product containing 25% by weight to 5% by weight (dry) of ettringite, the remainder being water, the process further comprising stirring the suspension continuously, the force of agitation being at least equal to and at most five times the force necessary for maintaining said suspension in a homogeneous state.

Stirring may be carried out by various means: stirrer rotating in a fixed vat, vat rotating on itself and containing solid bodies in suspension, vat subjected to alternating motion, liquid jets, etc. The force of stirring corresponds to that of the variations in time or space of the velocities or pressure in the suspension. It may be considered that when the power used for stirring is multiplied by five, the stirring itself is also multiplied by five.

The intensity of stirring is, as a general rule, measured by the power used for this stirring. The rotation speed of a rotating stirrer or of a rotating vat, the number of alternate movements in a time unit with the same amplitude, the pressure of a liquid jet with a constant flow, for instance, may be considered proportional to said energy of stirring, and therefore to said intensity of stirring with a sufficient precision for the need of the present process.

The force of stirring must obviously be regulated by preliminary trials in each case as a function of the starting conditions and the product desired. For the same suspension (the other conditions of operation remaining unchanged) the weaker the stirring, the longer the fibres obtained.

The temperature preferably lies in the range of from 60° to 90° C to compensate by a higher temperature for the slowing down of the reaction resulting from weaker stirring.

EXAMPLE 1

In the previously-mentioned Example 7 of U.S. Pat. No. 4,002,484 a suspension of an aluminous cement having the following composition:

$Al_2O_3$ = 72 parts by weight
$CaO$ = 27 parts by weight volatile matter = 0.24 part by weight
Fe$_2$O$_3$ = 0.07 part by weight was reacted with gypsum of the composition:

CaO = 35–36 parts by weight
SO$_3$ = 39–40 parts by weight
H$_2$O = 18 parts by weight
CO$_2$ = 6 parts by weight lime of the composition:

CaO   75%
CO$_2$   1–2%
H$_2$O   23–24% and water, in the following proportions (by weight):

12.6 parts of aluminous cement,
40.6 parts of gypsum,
13.3 parts of lime,
33.6 parts of water, to obtain stoichiometry and an additional amount of water to obtain a paste containing 15% by weight of ettringite or 567 parts of water.

The whole mass was treated in a jar mill rotating at a velocity of 70 rotations/minute.

In the present example the same aluminous cement as that described hereinabove was used and was reacted with a calcium sulphate having a composition (by weight) of:

CaO   33.2 parts
SO$_3$   43.4 parts
CO$_2$   2.7 parts
insolubles   12.5 parts and 89% commercial quicklime and water in the following proportions: 22 parts aluminous cement, 59 parts calcium sulphate, 19 parts lime and 1400 parts water, corresponding to obtaining a suspension comprising 10% by weight of ettringite.

The mixture was treated in a jar mill identical to that used in the above mentioned example, but maintained at 70° C and regulated to rotate at 6 rotations per minute, or 50% faster than the minimum velocity of rotation to maintain the solid matter in suspension. After 24 hours' stirring, a suspension of fibers having an average length of 60 microns and an average diameter of 1 to 2 microns (determined by a microscope with a systematic exploration system) was obtained.

The ettringite fibers can be used to replace (either completely or partially) asbestos fibers when the carcinogenic properties of this material may constitute counter-indications to its use as, for example, in the preparation of "asbestos-cement" materials or coatings and binders for fireproofing.

The U.S. Pat. No. 4,002,484 considers the possibility of preparing more or less thick suspensions of ettringite according to the amount of water added, and drying the thick suspensions, forming a paste to obtain them in powdery form.

In the case of fibrous ettringite, it was seen hereinabove that it is impossible to decrease the amount of water in the same proportions as it is necessary to have a suspension and not a paste. When it is desired to obtain ettringite in dry form, or having a low water content, water is removed from the obtained suspension, which contains a maximum of 25% by weight of solid matter, until aggregates containing 0 to 15% free water are obtained and which generally have a bulk density in the range of 0.5 to 1.3. Among the means which may be used to remove water from the suspension, a filter press is preferred.

The aggregates obtained may provide, for example, catalyst substrates or may be used in the manufacture of materials for thermal or phonic insulation.

An advantageous property of ettringite fibres is their good resistance to fire. They can be used for this purpose either in the form of fibres or aggregates prepared as previously explained.

EXAMPLE 2

A fire-resistance trial at 1100° C, using the ISO standard method, was conducted with 4 cm panels, certain of which were used as controls, these being made of plaster prepared from a semi-hydrate, the others being made of a mixture prepared from 70 parts of the same semi-hydrate and 30 parts of ettringite fibres obtained as previously described. Fire-resistance was 2 hours for the plaster panels and 4 hours for the mixed panels.

It is stated in Canadian Pat. No. 1,000,470 that the raw materials may contain calcium carbonate, which is found at the end of the operation and does not hinder certain operations. It has been established that, in the case of fibers, said calcium carbonate does not generally constitute a drawback, especially if it is in the form of fine particles. According to a particular method of the invention, in order for the carbonate to be in a very fine form in the final product, the aluminous cement is first reacted with the limestone and lime, which forms hydrated calcium monocarboaluminate of the formula:

3 CaO . Al$_2$O$_3$ . CaCO$_3$ . 11 H$_2$O this product then being reacted on the calcium sulphate, resulting in the formation of ettringite and the release of very fine particles, in the range of 1 to 2 microns, of calcium carbonate in the form of calcite. The obtained material can contain up to 20% by weight of calcite.

EXAMPLE 3

A heat vat was used to hydrate a mixture containing the following components:

Aluminous cement: 42.3 parts by weight
Limestone: 22.8 parts by weight
Lime: 34.9 parts by weight The aluminous cement and lime were of the same composition as in the previous example. The limestone was fine commercial calcium carbonate.

The proportion by weight of water was 4 times the weight of the solid mixture of the starting components. Hydration was conducted at 70° C. Measurement of bonded water, differential thermal analysis and X-ray diffraction showed hydration to be complete after 4 hours' stirring, and the formed product consisted entirely of hydrated calcium monocarboaluminate of the overall formula:

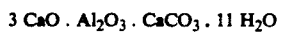
3 CaO . Al$_2$O$_3$ . CaCO$_3$ . 11 H$_2$O

The following were then added:

calcium sulphate in the form of the natural anhydrite of a mesh size of 100% passing at 200 microns in the proportion of:

69 parts by weight of primary hydrate
    39.2 parts by weight calcium sulphate water in an amount sufficient to obtain a final concentration of 15% hydrated dry matter, and the operation was conducted as in the preceding example.

An inert, white mineral powder was obtained consisting of:

1236 parts by weight of ettringite fibres
100 parts by weight of calcite.

Microscopic examination of the product obtained showed that the average length of fibers was 100 microns, with long fibers of up to 150 microns. The calcite was very fine, the grains observed being no greater than 1 to 2 microns in diameter.

The other methods and variants of the process described in U.S. Pat. No. 4,002,484 are also applicable in the process of the present application, with the exception of those relating to the presence of calcium silicates in the initial mixture; the latter result in the formation of tobermorites.

What we claim is:

1. A product which consists essentially of ettringite in the form of fibers having a length of from 1 to 350 microns.

2. Ettringite in the form of cement-free fibers having a length of from 2 to 350 microns.

3. Ettringite according to claim 2 in the form of fibers having an average length of 60 microns.

4. Ettringite according to claim 2 in the form of fibers having an average length of 100 microns.

5. A process for the preparation of ettringite fibers according to claim 1 which comprises adding water to, and thereby hydrating, a substantially-stoichiometric mixture of at least one calcium aluminate and at least one calcium sulphate at a temperature of from 20° C to 100° C to give ettringite, the amount of water which is added comprising the stoichiometric amount for one of the reactions:

(1) $CaO \cdot Al_2O_3 + 2(CaO \cdot H_2O) + 3(CaSO_4 \cdot 2H_2O) + 24 H_2O \rightarrow (CaO)_3Al_2O_3 \cdot 3CaSO_4 \cdot 32H_2O$ (ettringite)

(2) $(CaO)_3(Al_2O_3)_2 + 3(CaSO_4 \cdot 2H_2O) + 26 H_2O \rightarrow 1$ ettringite (3) $CaO(Al_2O_3)_2 + 5(CaO \cdot H_2O) + 6(CaSO_4 \cdot 2H_2O) + 47 H_2O \rightarrow 2$ ettringite (4) $12CaO \cdot 7Al_2O_3 + 9(CaO \cdot H_2O) + 21(CaSO_4 \cdot 2H_2O) + 173 H_2O \rightarrow 7$ ettringite (5) $CaO \cdot 6Al_2O_3 + 17(CaO \cdot H_2O) + 18(CaSO_4 \cdot 2H_2O) + 139H_2O \rightarrow 6$ ettringite and a supplementary amount of water, to obtain, after the reaction, a product containing 25% by weight to 5% by weight (dry) of ettringite, the remainder being water, the process further comprising continuously stirring the thus-formed suspension, the force of agitation being at least equal to and at most five times the force necessary for maintaining said suspension in a homogeneous state.

6. A process as claimed in claim 5, wherein the hydration is carried out at a temperature of from 60° C to 90° C.

7. A process as claimed in claim 5 wherein at least part of the calcium oxide is provided by limestone and wherein aluminous cement is first reacted with the limestone and lime to form hydrated calcium monocarboaluminate of the formula:

$$3 CaO \cdot Al_2O_3 \cdot CaCO_3 \cdot 11H_2O$$

this product then being reacted with the calcium sulphate, resulting in formation of ettringite and release of very fine particles of calcium carbonate.

8. A process as claimed in claim 5 wherein water is removed from the obtained suspension, and aggregates containing from 0 to 15% of free water are obtained.

9. A process as claimed in claim 5, wherein anhydrous or hydrated lime is added to the mixture in an amount such that resulting $Ca^{++}$ ions stoichiometrically balance the ettringite-formation reaction.

10. A process as claimed in claim 5 wherein the calcium aluminate comprises at least one of the aluminates $3 CaO \cdot Al_2O_3$, $12 CaO \cdot 7 Al_2O_3$, $CaO \cdot Al_2O_3$, $CaO \cdot 2Al_2O_3$, and $CaO \cdot 6Al_2O_3$.

11. A process as claimed in claim 5 wherein the calcium sulphate comprises at least one of gypsum ($CaSO_4 \cdot 2H_2O$), semihydrate ($CaSO_4 \cdot 1/2 H_2O$), "soluble" anhydride ($CaSO_4$), "overburnt" (anhydrous $CaSO_4$) and natural anhydrite.

12. A process as claimed in claim 5 wherein the calcium sulphate comprises at least one synthetic compound which is a by-product of the phosphorus fertilizer, fluorine, or magnesium industries.

13. A process as claimed in claim 5 wherein the calcium sulphate is natural carbonated calcium sulphate containing at least 60% pure calcium sulphate.

14. A process as claimed in claim 5 wherein the mixture additionally comprises carbonated hydrated lime containing less than 40% carbonate.

15. A process as claimed in claim 5 wherein the mixture comprises a refractory alumina cement, gypsum and lime.

16. A process as claimed in claim 5 wherein the calcium aluminate is finely ground.

17. A product obtained by a process as claimed in claim 5 and consisting essentially of ettringite fibers having a length from 2 to 350 microns.

18. A product as claimed in claim 17 further containing up to 20% by weight of calcium carbonate principally in the form of calcite.

* * * * *